3,010,952
DEASHING POLYMERS WITH ORGANIC CYANIDES
John R. Lovett, Metuchen, and Joseph M. Kelley, Jr., Cranford, N.J., and Daniel D. Perlmutter, Champaign, Ill., assignors to Esso Research and Engineering Company, a corporation of Delaware
No Drawing. Filed Apr. 8, 1959, Ser. No. 804,876
10 Claims. (Cl. 260—93.7)

This invention relates to an improved method of removing heavy metal ash from low pressure hydrocarbon polymers. More particularly, it relates to a process of this nature utilizing an organic cyanide as the deashing agent.

The low pressure polymerization and copolymerization of alpha olefins and diolefins with catalyst systems made up of a partially reduced, heavy transition metal compound and a reducing metal-containing compound to high density, often isotactic, high molecular weight, solid, relatively linear products has been assuming ever increasing importance and is now well known. One of the problems in these low pressure polymers is the ash content caused principally by the catalyst systems utilized. The potential ash content varied depending upon the catalyst efficiency obtained in the polymerization but generally ranges from about 3.0 to 0.5 wt. percent as determined by a fusion technique (dry ash). It has been observed that polymers with ash contents greater than about 0.10 wt. percent discolor badly during processing and tend to corrode the metals commonly used in processing equipment. For this reason reduction of the ash content to less than about 0.10 wt. percent is essential in order to produce a commercially desirable product.

This invention provides an improved method of removing heavy metal ash from the polymers discussed. The method comprises washing out the catalyst residues contained in the polymerization mixture with small amounts of an organic cyanide to reduce the content to the desired level.

It is surprising to learn that organic cyanides are more effective for this purpose than compounds such as acetone which had heretofore been employed.

The organic cyanides utilized comprise alkyl, aryl and aralkyl cyanides among others. Particularly effective and desirable compounds are acetonitrile, benzonitrile, phthalonitrile and phenylacetronitrile.

The amount of organic cyanide utilized in the process of this invention is not critical. In general, the range is from 0.5 to 4 moles per mole of potential catalyst residues. The temperature of treatment is conveniently in the range of about 25° to 80° C., with a time interval in the range of about 5 minutes to 24 hours. The washing operation of this invention is preferably carried out employing a moderately high degree of agitation such as is obtained with conventional commercial stirring apparatus. Very effective washings of polymeric products in accordance with the present invention are obtained when the washings are carried out in an inert atmosphere. In general, the washing operation is carried out in a non-aqueous medium.

The washing or washings can take place prior to the filtration or other separation of the polymers or subsequent thereto. In both cases the cyanide can be utilized alone or preferably in combination with other washing agents such as the alkanols. The washing step can also, if desired, be carried out in the presence of an inert hydrocarbon diluent such as, for example, saturated aliphatic hydrocarbons containing 1 to 10 carbon atoms, such as hexane and heptane. Staging can be used. Other hydrocarbon diluents which may be employed include benzene, toluene, petroleum mineral oils and cyclohexane.

For the purpose of convenience details of the low pressure catalytic process and the products obtained thereby are presented below, although it should be realized that these constitute no part of this invention.

The alpha olefinic feeds utilized in polymerization and copolymerization include ethylene, propylene, butene-1, heptene-1, dodecene-1, etc. with ethylene and propylene preferred.

Among the diolefins that can be used in copolymerization include butadiene, isoprene, piperylene, vinylcyclohexene, cyclopentadiene, 1,4-pentadiene, etc. It is to be understood that wherever the term "polymer" is used herein, it connotes both homo- and copolymers.

The process is described in the literature, e.g., see Belgian Patent 538,782 and "Scientific American" September 1957, pages 98 et seq.

In that process the polymers are prepared by polymerizing the constituent monomers in the desired proportions with the aid of certain polymerization catalysts, e.g., see above-mentioned Belgian patent. The catalysts are solid, insoluble reaction products obtained by partially reducing a heavy metal compound of groups IV–B, V–B, VI–B of the periodic system such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $$TiCl_3 \cdot 0.33 AlCl_3$$

thus containing cocrystallized $AlCl_3$. (For further details see copending U.S. application Serial No. 578,198, filed April 6, 1956, and Serial No. 766,376, filed October 19, 1958.) The product is then activated with an aluminum alkyl compound corresponding to the formula RR'AlX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The monomers are then contacted with the resulting catalyst in the presence of hydrocarbon solvents such as isopentane, n-pentane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a lower, i.e., $C_1$ to $C_8$ alkanol such as methyl alcohol or isopropyl alcohol is normally added to the reaction mixture for the purpose of partially dissolving and deactivating the catalyst and for precipitating the polymer product from solution. The alcohol alone does not remove sufficient ash to afford a desirable product. After filtration, the solid polymer may be further washed with alcohol or acid such as hydrochloric acid, dried, compacted and packaged.

The polymers produced have molecular weights in the range of about 100,000 to 300,000 or even as high as 3,000,000 as determined by the intrinsic viscosity method using the I. Harris Correlation (J. Polymer Science, 8, 361, 1952). The polymers can have a high degree of crystallinity and a low solubility in n-heptane.

It is to be understood that the term "low pressure" polymer as used herein connotes material prepared in the indicated manner.

This invention and its advantages will be better understood by reference to the following examples.

EXAMPLE 1

Polypropylene having a molecular weight of about 150,000 was prepared utilizing a preformed $$TiCl_3 - 0.2AlCl_3$$

catalyst (prepared from aluminum and $TiCl_4$) with aluminum triethyl as the activator. The theoretical ignition ash content was 1.3 wt. percent. The polymer slurry obtained was treated under a $N_2$ atmosphere with various reagents and 1/25 of the precipitating volume of isopropanol. After the mixture was allowed to stand for more than 20 minutes an equal volume of isopropanol was added. The mixture was stirred and filtered. The results and details are presented below:

Table I

| Reagent | Moles Reagent/Moles Metal | Ppt. Washed with 2 V. | Ash, Wt. Percent |
| --- | --- | --- | --- |
| acetonitrile in 1/25 precipitating volume of isopropanol. | 2/1 | isopropanol | 0.09 |
| acetonitrile in 1/25 precipitating volume of isopropanol. | 4/1 | do | 0.046 |
| acetone in 1/25 precipitating volume of isopropanol. | 4/1 | do | 0.160 |
| isopropanol alone, amount 1/25 precipitating volume. | 0 | do | 0.15 |

These data demonstrate the marked reduction ash obtained through the use of acetonitrile. The improvement obtained was superior to that gotten with acetone which is also included in Table I.

EXAMPLE 2

Various organic cyanides were compared in controlled experiments similar to that of Example 1 on the deashing of a polypropylene prepared in the same manner as in that example. Further details and the result are tabulated below:

Table II

| Quench Liquid | Moles Chelating Agent/Mole Metal | Ppt. Washed with 2 V. | Ash, Wt. Percent |
| --- | --- | --- | --- |
| acetonitrile in 1/25 precipitating volume of isopropanol. | 3/1 | isopropanol | 0.082 |
| benzonitrile in 1/25 precipitating volume of isopropanol. | 3/1 | do | 0.041 |
| phthalonitrile in 1/25 precipitating volume of isopropanol. | 3/1 | do | 0.053 |
| phenylacetonitrile in 1/25 precipitating volume of isopropanol. | 3/1 | do | 0.055 |

The marked reduction in ash content with the various cyanides from the 1.3 wt. percent theoretical ash is apparent.

The advantages of this invention will be apparent to those skilled in the art. Polymer products of reduced ash content are provided with maximum efficiency using inexpensive, readily available reagents. The acetonitrile is particularly cheap. Technical grade reagents can be employed further contributing to the economy of operation.

It is to be understood that this invention is not limited to the specific examples which have been offered merely as illustrations and that modifications may be made without departing from the spirit of the invention.

What is claimed is:

1. Method for removing heavy metal constituents in catalyst residues from solid, polymerized alpha olefins prepared with a heavy metal catalyst formed by admixing an aluminum alkyl with a halide of the group consisting of titanium and vanadium which comprises contacting the polymerized product containing heavy metal constituents with a small amount of an organic cyanide selected from the group consisting of acetonitrile, benzonitrile, phthalonitrile and phenylacetonitrile.

2. The method of claim 1 in which the organic cyanide is utilized in an amount of from 0.5 to 4 moles/mole of catalyst residue.

3. The method of claim 2 in which the temperature of contacting is in the range of about 25 to 80° C.

4. The method of claim 1 in which the polymerized product is polypropylene.

5. The process of claim 4 in which the organic cyanide is acetonitrile.

6. The process of claim 4 in which the organic cyanide is benzonitrile.

7. The process of claim 4 in which the organic cyanide is pthalonitrile.

8. The process of claim 4 in which the organic cyanide is phenylacetonitrile.

9. Method for removing heavy metal constituents in catalyst residues from solid, polymerized alpha olefins prepared with a heavy metal catalyst formed by admixing an aluminum alkyl with a titanium halide which comprises contacting the polymerized product containing heavy metal constituents with a small amount of an organic cyanide selected from the group consisting of acetonitrile, benzonitrile, phthalonitrile and phenylacetonitrile.

10. Method for removing heavy metal constituents in catalyst residues from solid, polymerized alpha olefins prepared with a heavy metal catalyst formed by admixing an aluminum alkyl halide with a titanium chloride which comprises contacting the polymerized product containing heavy metal constituents with a small amount of an organic cyanide selected from the group consisting of acetonitrile, benzonitrile, phthalonitrile and phenylacetonitrile.

References Cited in the file of this patent

UNITED STATES PATENTS 2,886,561    Reynolds et al. _____ May 12, 1959

FOREIGN PATENTS 1,180,634    France _____ Jan. 5, 1959